United States Patent

Hsu et al.

Patent Number: 5,196,219
Date of Patent: Mar. 23, 1993

[54] METHOD FOR PRODUCING A MICROWAVE BROWNING COMPOSITION

[75] Inventors: Chern J. Hsu, Alhambra; Nicholas Melachouris, Westlake Village, both of Calif.

[73] Assignee: Nestec S.A., Vevey, Switzerland

[21] Appl. No.: 587,082

[22] Filed: Sep. 24, 1990

[51] Int. Cl.⁵ .............................. A23B 5/00; A23L 1/00
[52] U.S. Cl. ..................................... 426/302; 426/94; 426/241; 426/243; 426/580; 426/657
[58] Field of Search ............... 426/302, 549, 89, 94, 426/241, 243, 303, 305, 656, 657, 658

[56] References Cited

U.S. PATENT DOCUMENTS

| | | | |
|---|---|---|---|
| 4,886,659 | 12/1989 | Baines et al. | 426/250 |
| 4,904,490 | 2/1990 | Buckholz et al. | 426/549 |
| 4,940,592 | 7/1990 | Byrne et al. | 426/549 |
| 4,943,697 | 7/1990 | Buckholz et al. | 426/243 |
| 4,985,261 | 1/1991 | Kang et al. | 426/243 |

OTHER PUBLICATIONS

Fennema, O. R., Food Chemistry, 1985, pp. 73,102, Mariel Dekker, Inc. New York.

*Primary Examiner*—Joseph Golian
*Assistant Examiner*—Leslie Wong

[57] ABSTRACT

This invention provides a browning agent for producing a browned surface on food products having a dough crust upon heating in a microwave oven. The browning composition is produced by spray drying an aqueous solution containing reducing sugar and milk protein, preferably an aqueous solution of milk solids which has been subjected to enzymatic hydrolysis to hydrolyze substantially all of the lactose in the milk solids solution to glucose and galactose, to form Amadori rearrangement compounds in the spray dried powder. The spray dried powder is reconstituted with water to form a solution which is coated onto the dough crust of the food product, such as fruit or meat pie. Upon heating in a microwave oven, the coated dough crust develops a desirable golden brown color. If desired, a salt selected from the group of sodium bicarbonate, trisodium phosphate and disodium phosphate may be included in the coating composition to enhance development of the brown color upon microwave heating.

21 Claims, No Drawings

METHOD FOR PRODUCING A MICROWAVE BROWNING COMPOSITION

BACKGROUND OF THE INVENTION

This invention relates to a microwave browning composition and to the method of producing the browning composition. More particularly, the invention relates to a coating composition for foods having a pastry crust which undergoes browning reactions upon microwave heating to provide cooked products having a desirable browned crust.

The usage of microwave ovens in homes has increased significantly in recent years and continues to increase. While microwave cooking of foods affords a significant time savings over conventional convection oven cooking, it suffers from the disadvantage that foods cooked by microwave energy lack the desired degree of surface browning that foods, particularly those having a dough crust such as meat pies and fruit pies, have when cooked in a conventional oven.

The most common reaction responsible for surface browning during cooking of products having a dough crust is the well-known Maillard reaction (non enzymatic browning) between naturally occurring reducing sugars and compounds containing an amino group, e.g. amino acids, peptides and proteins, which results in the formation of colored melanoidins. The rate at which the Maillard reaction proceeds to form the colored pigments increases markedly with temperature. When foods containing a dough crust, such as frozen pies, are heated in a conventional oven, the crust is heated to considerably higher temperatures than the interior of the pie, with the high surface temperatures being sufficient to achieve browning. However, in microwave heating the heat energy is released internally within the food so that the surface remains at a relatively even temperature with the interior. Consequently the high surface temperatures necessary to achieve browning are not reached within the time required to bake the pie.

A number of compositions have been proposed heretofor to create a browned surface on foods heated by microwave energy. However, none of these prior compositions has been entirely satisfactory due to flavor concerns, cost, ineffectiveness, difficulty of use, and other problems.

SUMMARY OF THE INVENTION

The present invention is directed to the use of a composition obtained by spray drying a solution containing reducing sugar and milk protein as a browning agent for microwavable foods, particularly foods having an unbaked dough crust, such as meat pies and fruit pies. Preferably, the browning composition is produced by hydrolyzing an aqueous solution of milk solids, such as skim milk, evaporated skim milk and reconstituted non-fat dry milk, with lactase enzyme to convert substantially all of the lactose in the solution to glucose and galactose, and spray drying the hydrolyzed milk solids solution. During spray drying, Amadori rearrangement products, which are intermediary compounds in the formation of colored Maillard reaction products, are formed in the spray dried product. The spray dried product is reconstituted with water and coated onto the surface of the uncooked dough crust of a meat or fruit pie. Upon heating the coated uncooked pie with microwave radiation, a desirable browned surface is developed on the crust during the time normally required to bake the pie, due to the formation of colored Maillard reaction products in the coating composition at microwave temperatures.

In accordance with a preferred embodiment of this invention, the inclusion of a water soluble salt selected from sodium bicarbonate, trisodium phosphate and disodium phosphate in the coating composition enhances the browning effect upon microwave heating.

DETAILED DESCRIPTION

In accordance with the present invention, an aqueous solution containing one or more reducing sugars and one or more milk proteins is spray dried to provide a dried product in which an increased amount of the lysine content of the milk protein is present as blocked lysine. Preferably the aqueous solution to be spray dried is provided by the enzymatic hydrolysis of an aqueous solution of milk solids in which substantially all (i.e. 90% or more) of the lactose in the milk solids solution is hydrolyzed to monosaccharides, glucose and galactose. As used herein, the term "aqueous solution of milk solids" includes both true solutions and colloidal solutions in which lactose and milk protein (casein, lactalbumin, and lactoglobulin) together comprise 80% or more by weight of the total milk solids, and fat is present in amounts of less than 1%. Generally lactose comprises at least about 40%, preferably between about 45% to 55%, by weight of the total solids of the solution and milk protein comprises at least about 30%, preferably between about 34% to 40%, thereof, with the protein: lactose ratio being approximately equivalent to that in whole milk. Excellent results have been obtained using aqueous solutions containing from about 4% to 50% or more by weight milk solids, with solutions having a milk solids content of between about 20% to 40% being preferred. Suitable solutions of milk solids include, for example, skim milk, evaporated skim milk (which has a fat content of about 0.2% and about 20.6% total solids, with lactose and protein comprising about 55% and 37% by weight, respectively, of the total solids) and non-fat dry milk which has been reconstituted with water to a desired level of milk solids.

The milk solids solution is hydrolyzed with lactase enzyme by any conventional procedure using mixed or purified lactase enzymes active at the pH of milk to hydrolyze the lactose to glucose and galactose, such as by hydrolyzing the solution of milk solids at 30° to 50° C. for from 30 minutes to 4 hours or more. The amount of enzyme may be varied widely. As a guide to selecting the proper amount, the addition of from 1.5% to 5.0% of lactase enzyme (3,000 units per cc) by weight of the quantity of lactose present in the milk concentrate will effect hydrolysis of over 90% of the lactose under the time-temperature conditions indicated above. When the desired degree of hydrolysis has been reached, the enzyme is thermally inactivated such as by heating the milk concentrate to pasteurization temperatures, e.g. 65° C.–75° C.

If desired, the hydrolyzed milk solids solution may be homogenized in a conventional one or two stage homogenizer at about 1500 psi to 6000 psi (105.4 to 421.8 kg./sq. cm.) total pressure.

The hydrolyzed milk solids solution is then introduced into a spray drier operating at an inlet temperature of between about 140° C. to 250° C. and an outlet temperature of about 76° C. to 99° C. to produce a powdered product having a moisture content of less than about 5%. Any conventional spray drier suitable for use in spray drying milk products may be used.

The spray dried powder thus obtained is reconstituted with water to form a coating solution having a solids content of at least about 10% which can be conveniently coated, for example by brushing, spraying, and the like onto the surface of a previously formed dough crust of a food to be baked in a microwave oven, such as a meat pie or fruit pie. Satisfactory results are obtained when such a composition is coated onto the surface of the dough crust at a level of about 0.02 gm/sq. cm. The crust may be formed of any of the well known dough materials conventionally used in the preparation of crusts for frozen pies, such as flour, water, fat or shortening, as well as conventional additives designed to modify flavor or texture. The coating solution may be applied to the dough crust at the time the pie is prepared, after which the resulting product is usually frozen and maintained in a frozen state until baking. Alternatively, the coating solution may be applied to the dough surface after the pie has been frozen.

The frozen product having the dough crust which has been coated with the composition of this invention may be baked in any microwave oven utilizing conventional time-temperature relationships which will vary depending on the nature and size of the frozen product. During microwave heating, the surface of the dough crust undergoes a browning chemical reaction to provide a baked crust having a desirable browned appearance similar in appearance to a dough crust which has been baked in a conventional oven or one which has been heated in a microwave oven in a package having an interactive layer which converts microwave energy to heat.

The browning reaction which occurs upon microwave heating of the coated dough crust is due to the formation of colored melanoidin pigments in the coating composition resulting from the Maillard reaction. It is believed that these compounds are formed in the present invention even at microwave temperatures due to the spray drying of the reducing sugar-milk protein solution prior to coating onto the dough crust. Thus, the Maillard reaction is a complex group of possible reactions which proceeds through several stages, including an initial stage in which reducing sugars react with amino groups to form Amadori rearrangement products, and subsequent stages involving dehydration, fragmentation and condensation reactions resulting in the formation of colored heterocyclic nitrogen compounds. The rates of these reactions are dependent on a number of factors, including temperature, with the initial stage i.e. the formation of Amadori rearrangement products, requiring substantially higher temperatures than are required for the subsequent stages. As discussed hereinabove, microwave heating of foods does not provide sufficiently high temperatures required for both the initial and subsequent stages of the Maillard reaction during the time required to cook the food.

While not wishing to be bound by any particular theory, it is believed that upon heating the reducing sugar-milk protein solids solution during spray drying, the reducing sugars, primarily glucose and galactose, react preferentially with amino groups of the amino acid lysine to form Amadori rearrangement products, as evidenced by a substantial increase in the blocked lysine content of the solution subsequent to spray drying. For example, aqueous milk solids solutions typically contain less than 10% blocked lysine, usually between about 3% to 8%. However, in the spray dried, enzymatically hydrolyzed milk solids solution of the present invention, at least about 15%, and preferably 40% or more, of the lysine is present as blocked lysine. When the spray dried product is reconstituted and coated onto the surface of the dough crust and subjected to microwave heating, the temperature is sufficient for the reaction to proceed through the subsequent stages of the reaction to form the colored Maillard reaction products in the coating composition, resulting in the formation of a browned surface on the dough crust.

In accordance with a preferred embodiment of the invention, a minor amount of a water soluble salt selected from the group of sodium bicarbonate, trisodium phosphate, and disodium phosphate is included in the composition applied to the surface of the dough crust. The salt, which may be dry blended with the spray dried reducing sugar-milk protein solution prior to reconstitution or added to the reconstituted solution, is present in the coating solution in amounts of between about 1% and 5% by weight of the solution, with amounts of 2% to 3% being preferred. The inclusion of such a salt in the coating solution enhances the development of a browned surface on the baked crust.

The following examples are intended to illustrate more fully the nature of the present invention without limiting its scope. Unless otherwise indicated, all parts and percentages are by weight.

EXAMPLE 1

Fifty four kilograms of low-heat non-fat dry milk powder (containing approximately 51% lactose and 36% protein) was dissolved in 63 kilograms of water at 43.3° C. to provide an aqueous milk solids solution which was introduced into a hot water jacketed kettle to maintain the temperature of the concentrate at 40° C. The milk solids solution was hydrolyzed by the addition of 1300 ml lactase enzyme (NOVO Lactozyme 3000L) at 40° C. for 1 hour to hydrolyze more than 90% of the lactose in the solution to glucose and galactose. The milk solids solution was then heated to 68.3° C. for 20 min. to pasteurize the solution and inactivate the enzyme, after which the solution was homogenized at 2500/500 psi (175.75/35.15 kg/sq. cm.) and spray dried, with inlet temperature set at 149° C. and outlet temperature set at 99° C. The spray dried product thus obtained was white in appearance. Analysis of the milk solids solution prior to and subsequent to spray drying showed an increase in the percent of lysine as blocked lysine from about 3%, prior to spray drying, to about 43% in the spray dried product, as determined by the furosine method.

An amount of 12.5 gm of the spray dried product was dissolved in 37.5 ml water and the resulting solution (pH 6.2) was brushed onto the dough crust of a frozen conventional chicken pie at a level of about .02 gm/sq. cm., and the pie was then baked in a 700 watt Panasonic microwave oven at high setting for 9 minutes. The resulting baked product had a golden brown crust with a glossy appearance, typical of a pie baked in a conventional convection oven. A similar frozen chicken pie heated under the same conditions but without the coating of the present invention, had a crust having an unbaked appearance.

EXAMPLE 2

The procedure of Example 1 was repeated with the exception that sodium bicarbonate was dry blended with the spray dried solution, prior to reconstitution, in an amount of 2% by weight of the reconstituted solution. The crust of the baked chicken pie coated with the resulting solution developed a darker brown color than the crust of a pie coated with the reconstituted spray dried concentrate without the sodium bicarbonate.

Similar results were obtained using a coating solution containing 2% by weight trisodium phosphate and one containing 2% by weight disodium phosphate pre-blended with the spray dried hydrolyzed solution.

EXAMPLE 3

Two thousand ml of evaporated skim milk, having a milk solids content of 21% and containing on a dry basis about 55% lactose and 37% protein, was hydrolyzed with 8 ml lactase enzyme (NOVO Lactozyme 3000L), at 40° C. for 1 hour, after which time the enzyme was thermally inactivated. The degree of hydrolysis was determined by the reverse phase HPLC, with more than 95% of the lactose being hydrolyzed to glucose and galactose. A 100 ml. aliquot of the hydrolyzed evaporated skim milk was removed for subsequent evaluation. The remaining hydrolyzed milk was then spray dried in a Niro atomizer at an inlet temperature of 200°–210° C. and an outlet temperature of 95° C. In the resulting spray dried product, about 63% of the lysine was present as blocked lysine, as compared to about 8% in the evaporated skim milk starting material. The spray dried product was reconstituted with water to provide a solution having a solids content of 21%, and about 3.5 gm of the resulting solution coated onto the crust of a conventional frozen chicken pie (approximately 300 gm) in accordance with the procedure set out in Example 1. After coating, the frozen pie was heated in a 700 watt Panasonic microwave oven at high power for 9 minutes. The crust of the heated pie had a desirable golden brown appearance which extended over substantially the entire crust.

The 100 ml aliquot of hydrolyzed evaporated skim milk which was removed prior to spray drying was coated onto the crust of a second frozen chicken pie in the same amount indicated above, and the coated frozen pie heated in the same microwave oven at the same conditions, i.e. at high setting for 9 minutes. The crust of the resulting heated pie had a light tan appearance which was substantially inferior in appearance to the heated pie crust coated with the composition of this invention.

EXAMPLE 4

Aqueous solutions of milk solids containing 4% and 9% milk solids were prepared and evaluated as follows.

An amount of 80 gm. of low-heat non-fat dry milk powder was dissolved in 1920 ml water to provide a solution containing 4% milk solids. The solution was heated to 40° C. on a water bath and 2.0 ml lactase enzyme (NOVO Lactozyme 3,000 L) was added and the solution incubated at 40° C. for 1 hour to hydrolyze substantially all of the lactose to glucose and galactose. At the end of one hour, the solution was heated to 80° C. for 5 minutes to inactivate the enzyme, and the hydrolyzed solution was spray dried (inlet temperature 210° C., outlet temperature 95° C.).

The spray dried powder obtained from the 4% milk solids solution was dissolved in water to provide a 30% solution, and about 1.5 gm to 2.0 gm of the reconstituted solution was brushed onto the crust of a commercial frozen chicken pie (approximately 300 gm). The frozen pie was then heated in a 700 watt Panasonic microwave oven at high power for 10 minutes. The heated pie had a golden brown crust with a glossy appearance, similar to that obtained in Example 1.

This procedure was repeated with the exception that 180 gm of low-heat non-fat dry milk powder was dissolved in 1820 ml water to provide a solution containing 9% milk solids, and 4.3 ml of the enzyme was added to the milk solids solution. A 30% reconstituted solution of the spray dried powder coated onto the crust of a frozen chicken pie and microwaved under the same conditions also produced a pie having a golden brown crust.

EXAMPLE 5

A dry mixture of the following ingredients was prepared.

| Ingredient | % by weight |
| --- | --- |
| Glucose | 29% |
| Galactose | 29% |
| Sodium caseinate | 31% |
| Whey protein concentrate | 11% |

Five hundred grams of the mixture were dissolved, with agitation, in 1500 ml warm water, and the resulting solution was spray dried in a Niro atomizer at 210° C. inlet temperature and 95° C. outlet temperature. The spray dried product was reconstituted with water to provide a viscous solution having a solids content of 30%. The viscous solution was coated onto the crust of a frozen chicken pie and the coated pie was heated in a 700 watt microwave oven on high for about 10 minutes. The crust of the heated pie had a desirable golden brown appearance similar to that obtained in Example 1.

What is claimed is:

1. A method of producing a microwave browning composition for a food product having a dough crust which consists essentially of
   spray drying an aqueous solution containing reducing sugar and milk protein to form a dried powder containing Amadori rearrangement products in which at least about 15% of the lysine content of the milk protein is present as blocked lysine, and
   reconstituting the spray dried powder with an aqueous medium to form a solution which when coated onto the surface of a dough crust undergoes a browning reaction upon microwave heating.

2. The method defined in claim 1 in which the reducing sugar is selected from the group consisting of glucose, galactose and mixtures thereof.

3. The method defined in claim 1 in which at least 40% of the lysine content of the spray dried powder is present as blocked lysine.

4. The method defined in claim 1 in which the spray dried powder is reconstituted with water to form a solution having a solids content of at least about 10%.

5. The method defined in claim 1 in which a salt selected from the group consisting of sodium bicarbonate, trisodium phosphate and disodium phosphate is included in the reconstituted solution in an amount of between about 1% to 5% by weight of the solution.

6. The method defined in claim 1 in which said aqueous solution is provided by subjecting an aqueous solution of milk solids, in which at least about 80% of the total solids comprises lactose and milk protein, to enzymatic hydrolysis to hydrolyze at least about 90% of the lactose to glucose and galactose.

7. The method defined in claim 6 in which the aqueous milk solids solution contains at least about 4% by weight of milk solids, with lactose comprising at least about 45% by weight and milk protein comprising at least about 30% by weight of the total milk solids of the solution.

8. The method defined in claim 6 in which the aqueous milk solids solution is hydrolyzed with lactase enzyme under conditions sufficient to hydrolyze at least about 90% of the lactose in said solution to glucose and galactose.

9. The method defined in claim 5 in which at least 40% of the lysine content of the spray dried milk solids solution is present as blocked lysine.

10. The method defined in claim 9 in which at least 40% of the lysine content of the spray dried powder is present as blocked lysine.

11. The method defined in claim 6 in which the hydrolyzed solution is spray dried by spraying the solution in hot air having a temperature of at least about 140° C.

12. The method defined in claim 6 in which the reconstituted solution contains at least about 20% by weight of the spray dried powder.

13. The method defined in claim 6 in which the aqueous solution of milk solids is selected from the group consisting of skim milk, evaporated skim milk and reconstituted non-fat dry milk.

14. The method defined in claim 6 in which the aqueous milk solids solution contains between about 20% to 50% by weight of milk solids.

15. The method defined in claim 6 in which a salt selected from the group consisting of sodium bicarbonate, trisodium phosphate and disodium phosphate is included in the reconstituted solution in an amount of between about 1% to 5% by weight of the solution.

16. A method for treating a food product having a dough crust to render the surface brownable upon exposure to microwave energy, which consists essentially of coating the surface of the dough crust with an aqueous composition containing at least 10% by weight of a spray dried powder obtained by spray drying an aqueous solution of a reducing sugar and milk protein under conditions sufficient to convert at least about 15% of the lysine content of the milk protein to blocked lysine.

17. The method defined in claim 16 in which the spray dried powder is a spray dried hydrolysate of a milk solution in which at least about 90% of the lactose has been hydrolyzed to glucose and galactose prior to spray drying.

18. The method defined in claim 16 in which the milk solution contains at least about 4% by weight of milk solids, with lactose comprising at least about 45% by weight and milk protein comprising at least about 30% by weight of the milk solids.

19. The method defined in claim 16 in which the milk solution is selected from the group consisting of skim milk, evaporated skim milk, and reconstituted non-fat dry milk.

20. The method defined in claim 16 in which the aqueous composition includes between about 1% to 5% by weight of a salt selected from the group consisting of sodium bicarbonate, trisodium phosphate and disodium phosphate.

21. The method defined in claim 16 in which at least about 40% of the lysine content of the milk protein is converted to blocked lysine.

* * * * *